Patented July 24, 1934

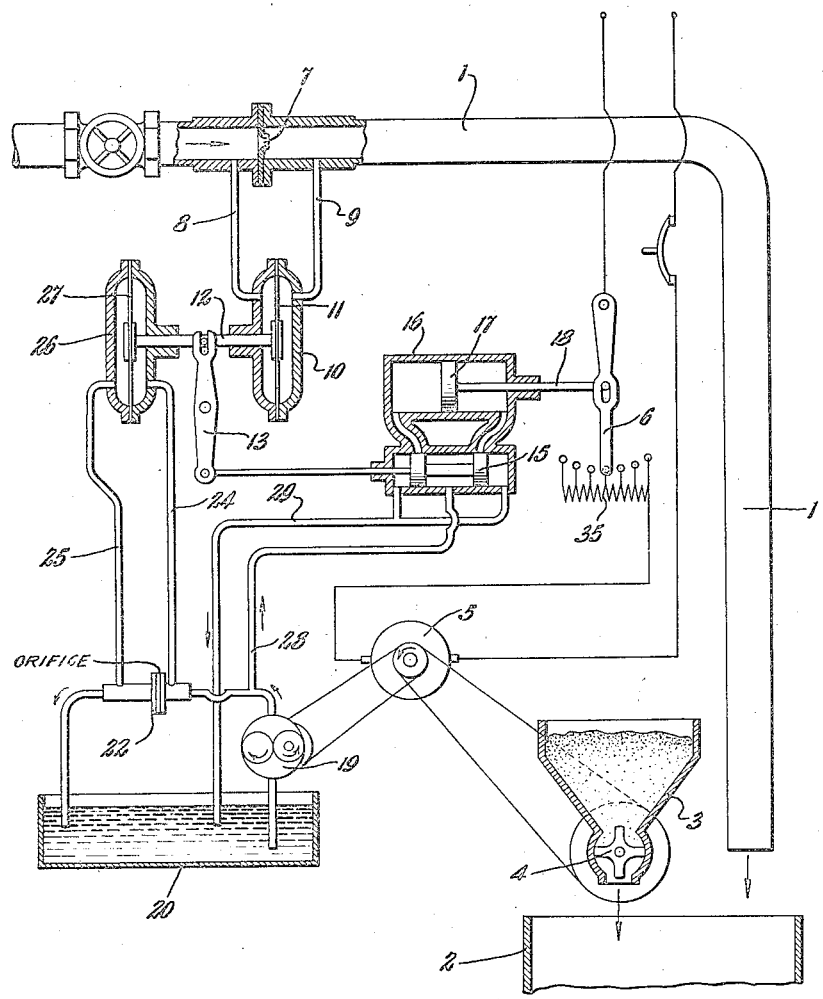

1,967,690

UNITED STATES PATENT OFFICE

1,967,690

VARIABLE PROPORTIONER DRIVE

William T. Sherman, Woodbury, N. J., assignor to Socony-Vacuum Corporation, New York, N. Y., a corporation of New York Application October 21, 1933, Serial No. 694,682

3 Claims. (Cl. 210—31)

This invention relates to means for producing continuously and automatically, a mixture, in predetermined proportion, of a liquid such as water and a reagent or material to be added thereto. The invention is applicable, for example, to apparatus for treating boiler-feed water by the addition of a definite quantity of a softening reagent while the water flows continuously into a treating tank.

The purpose of the invention is to produce an apparatus which shall be simple and rugged in construction, and accurate and reliable in operation.

It is well known that the rate of flow of a fluid through a conduit may be indicated by the pressure, or the pressure differential, created in the conduit by a constriction or a baffle such as a Venturi tube, a metering orifice or a pitot tube. Accordingly, such pressure or pressure differential may be utilized to control the speed of mechanism for feeding material in a predetermined ratio to the volume of fluid flowing in the conduit. The pressure changes in the conduit, however, are not in constant ratio with the rate of flow, but follow some special law characteristic of the form of baffle or construction which is used, and the variations in speed of the feed mechanism must follow the same law in order to feed material in constant ratio to the flow of fluid.

The fact just stated introduces a difficulty in the control of the feed mechanism by the direct influence of pressure in the conduit, and the difficulty is increased by the fact that variations in the load on the feed mechanism, and in the operation of the source of power by which the mechanism is actuated, tend to introduce casual variations in any predetermined proportion between conduit pressure and speed of feed.

In accordance with the present invention, the difficulties just mentioned are avoided by controlling the speed of the feed mechanism by the combined and balanced effect of the pressures in the main fluid conduit and the pressures in a secondary conduit fed by a pump which is driven in constant speed-relation with the feed mechanism. A baffle, constriction or the like in this secondary conduit creates pressures, or pressure differentials, in this conduit which follow the same law as those in the main conduit. The respective pressures or differentials are balanced against each other, and means are provided which act automatically, upon any disturbance of such balance, to change the speed of the drive-mechanism in the sense to restore the balance. So long as the balance is maintained the speed of the feed mechanism varies directly as the flow of fluid in the main conduit.

Further features of the invention are noted in connection with the description of the embodiment thereof hereinafter described.

The accompanying drawing is a diagrammatic illustration of the essential features of apparatus for adding a solid reagent to water or other liquid in accordance with the method of the present invention.

In the illustrated embodiment of the invention, the water or other liquid to which a solid material or reagent is to be added flows through a conduit 1, from which it is discharged into a mixing tank or receptacle 2. The solid material is fed into the same receptacle, from a hopper 3 provided with a conventionally illustrated rotary feeder 4. This feeder is driven by an electric motor 5. The speed of the motor is controlled by a rheostat 35, comprising a swinging arm 6 which cuts more or less resistance into the motor circuit.

A pressure differential varying directly with the flow of liquid in the conduit 1 is produced by a metering orifice 7 in the conduit, and the pressures on opposite sides of the orifice are communicated, through pipes 8 and 9, to opposite sides of a diaphragm chamber 10 containing a diaphragm 11. A stem 12, attached to the diaphragm, moves a lever 13 which is connected through a rod 14, with the slide valve 15 of a hydraulic engine 16. The piston 17 of the hydraulic engine is connected, by a piston rod 18, with the rheostat arm 6, so that the motor speed is controlled by movements of the piston.

A gear pump 19 is also driven by the electric motor 5, at a speed having a constant ratio with the speed of the motor and that of the feeder 4. This pump draws a liquid, such as oil, from a tank 20 and forces it through a secondary conduit 21. This conduit contains an orifice member 22 which is formed and arranged to follow the same law relating pressure differential to rate of flow as that governing the orifice 7 in the main conduit. The pressures on opposite sides of the orifice in the secondary conduit are communicated, through pipes 24 and 25, to opposite sides of a diaphragm chamber 26 containing a diaphragm 27. The diaphragm 27 is connected to one end of the stem 12.

The connections to the two diaphragms are so arranged that the relatively high pressures in the two conduits are balanced against each other on the adjacent sides of the two diaphragms, while the relatively low pressures from the two conduits are balanced against each other on the remote sides of the diaphragms. Accordingly, so long as the rate of flow in the secondary conduit varies in direct and constant proportion with the rate of flow in the main conduit, the pressures effective against the diaphragms will be balanced and the slide valve of the hydraulic engine will remain in a neutral position, with the piston of the engine and the arm of the rheostat stationary in whatever position they may occupy at the moment. Under these conditions the rate of feed from the hopper 3 will be in the predetermined ratio to the flow of liquid through the main conduit.

Whenever, for any reason, the pressures effected upon the diaphragms become unbalanced, a movement of the diaphragms in one direction or the other will occur and this movement, being communicated to the slide valve 15, will permit fluid to be introduced into one end of the cylinder of the engine and exhausted from the other, so that the piston 17 will move in one direction or another and thus move the rheostat arm. The parts are so arranged that this movement results in changing the resistance of the motor circuit in the sense necessary to change the speed of the motor, and of the pump 19, so as to restore the balance of pressures against the diaphragms, and at the same time to change the speed of the feeder 4. As soon as the balance of pressures is restored the slide valve 15 returns to neutral position, and the piston 17 and the rheostat arm 6 thereafter remain in the position to which they have moved, until some further disturbance of the pressure balance occurs.

As a convenient fluid for the activation of the hydraulic engine, the oil or other liquid forced by the pump 19 may be utilized, and for this purpose this liquid is conducted, from the conduit 21, through a pipe 28 to the high-pressure side of the slide valve, while the exhaust side of the valve discharges, through a pipe 29, back to the tank 20. The conduit 21 also discharges into the tank 20, so that the volume of liquid in this tank remains constant.

While a hydraulic engine is utilized, in the apparatus illustrated and described, as the means for controlling the motor speed in accordance with displacements of the diaphragms, it will be obvious that the diaphragms, or other pressure-responsive means, may be arranged to control the motor speed more directly, or to do so through the intermediation of various other power devices. It will also be obvious that various means may be used for varying the speed of the feeder and the pump, other than the motor and rheostat shown and described, and that the feed mechanism will necessarily have various forms in accordance with the character of the material which is to be proportioned and fed.

I claim as my invention:

1. In proportioning apparatus, the combination, with a fluid conduit in which fluid pressure varies directly with rate of flow, proportionate feeding mechanism including a pump which creates a fluid pressure varying directly with the speed of the pump, variable-speed driving means for said feeding mechanism, and a speed controller, for said driving means, subject in opposite senses to the two said fluid pressures and constructed and arranged to change the speed of the driving means, whenever said pressures depart from a predetermined ratio, in a sense to restore such ratio through change in the pressure created by the pump.

2. In proportioning apparatus, the combination, with a fluid conduit in which fluid pressure varies directly with rate of flow, proportionate feeding mechanism including a pump which creates a fluid pressure varying directly with the speed of the pump, variable-speed driving means for said feeding mechanism, and a speed controller, for said driving means, subject in opposite senses to the two said fluid pressures and constructed and arranged to change the speed of the driving means, whenever said pressures depart from a predetermined ratio, in a sense to restore such ratio through change in the pressure created by the pump, said speed controller comprising a fluid engine supplied with motive fluid by said pump.

3. In proportioning apparatus, the combination of a main fluid conduit for feeding a fluid to be proportioned, a measuring device for feeding material in proportion to the speed of movement of said device, a secondary fluid conduit, a pump for forcing fluid through said secondary conduit, driving means for driving both said measuring device and said pump at speeds having a constant ratio, means in each of said conduits for producing a pressure differential therein in proportion to the rate of flow of the fluid therein, pressure-controlled means connected with both said conduits and subject to both said pressure differentials in opposite senses, and speed-controlling mechanism operative upon said driving means, controlled by said pressure-controlled means, and responsive to any unbalance of the pressures therein to change the speed of the driving means in the direction to restore the balance of said pressures.

WILLIAM T. SHERMAN.